United States Patent
Van Dijck et al.

(10) Patent No.: US 10,793,313 B2
(45) Date of Patent: Oct. 6, 2020

(54) ASSEMBLY COMPRISING A WIDE-MOUTH PLASTIC PREFORM OR CONTAINER HAVING A REINFORCED NECK FINISH AND A SCREWABLE CLOSURE

(71) Applicant: Plastipak BAWT S.à r.l., Bascharage (LU)

(72) Inventors: Sam Van Dijck, Hoogstraten (BE); Steve Windelinckx, Zoersel (BE); Natalia Matthieu, Antwerp (BE); Alain Dessaint, Kampenhout (BE); Jan Deckers, Brecht (BE)

(73) Assignee: Plastipak BAWT S.á.r.l., Bascharage (LU)

( * ) Notice: Subject to any disclaimer, the term of this patent is extended or adjusted under 35 U.S.C. 154(b) by 565 days.

(21) Appl. No.: 14/764,518

(22) PCT Filed: Jan. 17, 2014

(86) PCT No.: PCT/EP2014/050850
§ 371 (c)(1),
(2) Date: Jul. 29, 2015

(87) PCT Pub. No.: WO2014/118016
PCT Pub. Date: Aug. 7, 2014

(65) Prior Publication Data
US 2015/0375887 A1     Dec. 31, 2015

(30) Foreign Application Priority Data
Jan. 30, 2013   (EP) ..................................... 13153203

(51) Int. Cl.
*B65D 1/02*     (2006.01)
*B65D 41/04*    (2006.01)
(Continued)

(52) U.S. Cl.
CPC ......... *B65D 1/0246* (2013.01); *B65D 1/0207* (2013.01); *B65D 1/0223* (2013.01);
(Continued)

(58) Field of Classification Search
CPC .. B65D 1/0246; B65D 1/0207; B65D 1/0223; B65D 41/0442; B29B 2911/14666;
(Continued)

(56) References Cited

U.S. PATENT DOCUMENTS 5,100,013 A * 3/1992 Strassheimer ..... B65D 41/0421
                                                       215/354
6,702,133 B1 * 3/2004 Shenkar ............... B65D 41/045
                                                       215/249

(Continued)

FOREIGN PATENT DOCUMENTS

EP     1145977 A1    10/2001
EP     2100707 A1     9/2009
(Continued)

OTHER PUBLICATIONS

Sato (JP 2010241505A Machine Translation, 2010, p. 1-11).*
(Continued)

*Primary Examiner* — Gerard Higgins
*Assistant Examiner* — Kevin C Ortman, Jr.
(74) *Attorney, Agent, or Firm* — Fishman Stewart PLLC (57) ABSTRACT

A container (1) and a screwable closure (2) comprising a hollow body (11) and a neck finish (10) terminated by a wide-mouth opening (100). Said neck finish comprises a neck support ring (102) and a neck portion (101) extending between the wide-mouth opening (100) and the neck support ring (102). The neck portion (101) comprises an upper portion (1010) and a reinforced lower portion (1011). The inner face (1011 *b*) of the reinforced lower portion (1011) is transitioning to the inner face (1010*b*) of the upper portion (Continued)

(1010) along a transition step (1011c) in such a way that said reinforced lower portion (1011) is thicker than the upper portion (1010) at least in a top part of the reinforced lower portion (1011). The neck support ring (102) is below the removable closure (2).

33 Claims, 8 Drawing Sheets (51) Int. Cl.
| | |
|---|---|
| B29L 31/56 | (2006.01) |
| B29C 49/06 | (2006.01) |
| B29C 49/08 | (2006.01) |
| B29B 11/08 | (2006.01) |
| B29B 11/14 | (2006.01) |
| B29L 31/00 | (2006.01) |

(52) U.S. Cl.
CPC .......... *B65D 41/0442* (2013.01); *B29B 11/08* (2013.01); *B29B 11/14* (2013.01); *B29B 2911/14013* (2013.01); *B29B 2911/1466* (2013.01); *B29B 2911/1472* (2013.01); *B29B 2911/1474* (2013.01); *B29B 2911/1486* (2013.01); *B29B 2911/14446* (2013.01); *B29B 2911/14666* (2013.01); *B29B 2911/14726* (2013.01); *B29C 49/06* (2013.01); *B29C 49/08* (2013.01); *B29L 2031/565* (2013.01); *B29L 2031/716* (2013.01)

(58) Field of Classification Search
CPC .......... B29B 2911/14013; B29B 11/14; B29B 2911/1466; B29B 2911/1472; B29L 2031/565; B29L 2031/716; B29C 49/06; B29C 49/08

USPC ...... 220/270, 254.3, 258.2, 258.3, 521, 708, 220/715, 718, 737; 215/228, 262, 356, 215/387, 395, 40, 42, 44, 6; 428/35.8, 428/35.7, 438, 452, 464, 532, 535
See application file for complete search history.

(56) References Cited

U.S. PATENT DOCUMENTS

| | | | |
|---|---|---|---|
| 2013/0087943 A1* | 4/2013 | Tsuchiya | B29C 71/0063 264/237 |
| 2013/0216748 A1* | 8/2013 | Siegl | B29C 49/04 428/36.6 |

FOREIGN PATENT DOCUMENTS

| | | | | |
|---|---|---|---|---|
| FR | 2722479 A1 | 1/1996 | | |
| FR | 2921906 A1 | 4/2009 | | |
| GB | 987998 | 3/1965 | | |
| JP | 2010241505 A * | 10/2010 | | |
| JP | WO 2011148879 A1 * | 12/2011 | .......... | B29C 71/0063 |
| JP | 2013028137 A | 7/2013 | | |
| WO | WO 2011160748 A1 * | 12/2011 | ............. | B29B 11/14 |

OTHER PUBLICATIONS

DICT ("Convex," p. 1-2, Webster's Revised Unabridged Dictionary, 1913, C. & G. Merriam Co., Springfield, Mass. Under the direction of Noah Porter, D.D., LL.D.).*
FR2921906, machine translation, Gabriel Evain, p. 1-11, Oct. 8, 2007.*
European Patent Office; International Search Report and Written Opinion issued in corresponding International Application No. PCT/EP2014/050850, dated Feb. 28, 2014.

* cited by examiner

ASSEMBLY COMPRISING A WIDE-MOUTH PLASTIC PREFORM OR CONTAINER HAVING A REINFORCED NECK FINISH AND A SCREWABLE CLOSURE

TECHNICAL FIELD

The present invention relates to a assembly comprising a wide-mouth plastic preform or container having a reinforced neck finish and a removable closure than can be screwed onto the wide-mouth plastic preform or container.

PRIOR ART

Plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, recyclable and can be easily manufactured in large quantities.

PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container.

Container manufacturers use mechanical processing and thermal processing to increase the PET polymer crystallinity of a container.

Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container.

More particularly, a well-known technique for manufacturing a thermoplastic container is the so-called injection stretch-blow molding technique, wherein (first step) a thermoplastic material is injected in a mold in order to form a preform (semi-finished product), and subsequently (second step) said preform is biaxially stretched in a mold in order to form a rigid hollow container of any kind of shapes and sizes, like for example a bottle-shaped container, a jar, etc. . . .

Typically, a preform comprises a neck finish, a closed bottom end, and a main tubular body extending between said closed bottom end and said neck finish. Said neck finish comprises a cylindrical wall terminated by a mouth opening and an outer neck support ring surrounding the cylindrical wall. When the preform is blow molded in a mold, the neck finish is used for maintaining the preform in the blowing mold, and is thus not stretched. The main tubular body is biaxially stretched (in a longitudinal direction and in a radial direction) in order to form a container body of predefined shape. The preform closed bottom end is also biaxially stretched, but with a normal radial stretch ratio and a low longitudinal stretch ratio, in order to form typically the bottom base of the final blow-molded container.

Depending of the injection step, the preform body and the preform closed bottom end can have a monolayer structure or a multilayer structure (for example if a co-injection and/or sequential injection step is performed).

In a so-called "one stage process", the second step (stretch-blow molding) is performed in line immediately after the first step (preform injection). In a so-called "two stages process", the second step (stretch-blow molding) is postponed, and a reheating of the preform is performed prior to the stretch-blow molding operation.

In a first well-known stretch-blow molding process, the mouth opening of the neck finish is hermetically closed, and a stretching rod is introduced inside the preheated preform and is used for axial stretching and for introducing blowing air under pressure inside the preform via a nozzle, in order to biaxially stretch the preform in a mold and to form a rigid plastic container. In such a well-known blowing process, the pressure inside the preform is high and such high pressure can lead to a deformation of the neck finish.

In order to reduce the risk of deformation of the neck finish, especially for preforms with a thin wall neck finish, a second well-known blowing process, called therein "isobaric process" or "isobaric blowing", is preferred. In the so-called isobaric process, the mouth opening of the preform is not hermetically closed but a blowing nozzle head is adapted onto the preform neck finish in such a way to close the preform by making a seal between the blowing nozzle head and the top side of the preform neck support ring or the topsurface of the blowmould.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is generally opaque. Used after mechanical processing, however, thermal processing can result in higher crystallinity and excellent clarity for those portions of the container having biaxial molecular orientation. The thermal processing of an oriented PET container, which is known as heat setting, typically includes blow molding a PET preform against a mold heated to a temperature of approximately 121° C.-177° C., and holding the blown container against the heated mold for approximately one to five seconds.

Thermal processing is also commonly used to promote crystal growth in the neck finish of the preform or container and to obtain a crystallized neck finish, which is generally opaque and white in case of non-colored PET material. A crystallized neck finish has an improved mechanical strength and is advantageously more difficult to deform. Crystallized neck finishes are for example commonly used in the field of hot-filling for making hot-fill containers, i.e. containers that are intended to be hot-filled with a product, and for example with food such as beverages, juices, etc.

Wide-mouth plastic containers, such as for example jars or the like, are also commonly used for packaging a product, and especially a food product. Typically a wide-mouth plastic container has a mouth opening having an inner diameter of at least 40 mm, and more generally of at least 50 mm, in contrast for example with narrow-mouth plastic containers, such as bottles, with a mouth opening having a small inner diameter typically of less than 30 mm.

Typically, the height of the portion of the neck finish of a PET wide-mouth plastic container or preform above the neck support ring is generally not less than 15 mm. In some applications however, and for example when the neck finish is an opaque crystallized neck finish, and/or when the wide-mouth plastic container is closed by a lid of small height such as a metal lid, this height of at least 15 mm is not acceptable by the final consumer, because the visual gap between the neck support ring and a closure fitted onto the neck finish is too high and unaesthetic, and gives to the consumer the feeling that the container is not correctly closed.

There is thus a need to reduce the height of this neck finish portion above the neck support ring. Unfortunately, and against all expectations, the reduction of the neck finish height above the neck support ring of a plastic wide-mouth plastic container or preform surprisingly renders the neck finish more easily deformable under mechanical and/or thermal constraints. This higher deformability of such a wide-mouth short neck finish can lead to detrimental leakage problems when the container is hermetically closed by a removable closure that is screwed onto the wide-mouth container in such a way that a sealing is achieved between the closure and only a top part of the container neck finish, without any sealing between the closure and the inner face of a lower part of the container neck finish. These leakages problems are even more important when the wide-mouth container has been hot filled and/or pasteurized

OBJECTIVE OF THE INVENTION

An objective of the invention is to propose an assembly comprising a wide-mouth plastic container or preform and a removable closure than can be screwed onto the wide-mouth plastic preform or container, said wide-mouth plastic container or preform having an improved neck finish that is more resistant to deformation.

SUMMARY OF THE INVENTION

This objective is achieved by the assembly of claim 1 wherein the container or preform has a reinforced neck finish.

BRIEF DESCRIPTION OF THE DRAWINGS

Other characteristics of the invention will appear more clearly on reading the following detailed description which is made by way of non-exhaustive and non-limiting example, and with reference to the accompanying drawings, in which.

DETAILED DESCRIPTION

Some preferred embodiments of the invention are discussed in detail below. While specific exemplary embodiments are discussed, it should be understood that this is done for illustration purpose only. A person skilled in the art will recognize that other container designs or container dimensions can be used without parting from the spirit and scope of the invention.

Figure 1:
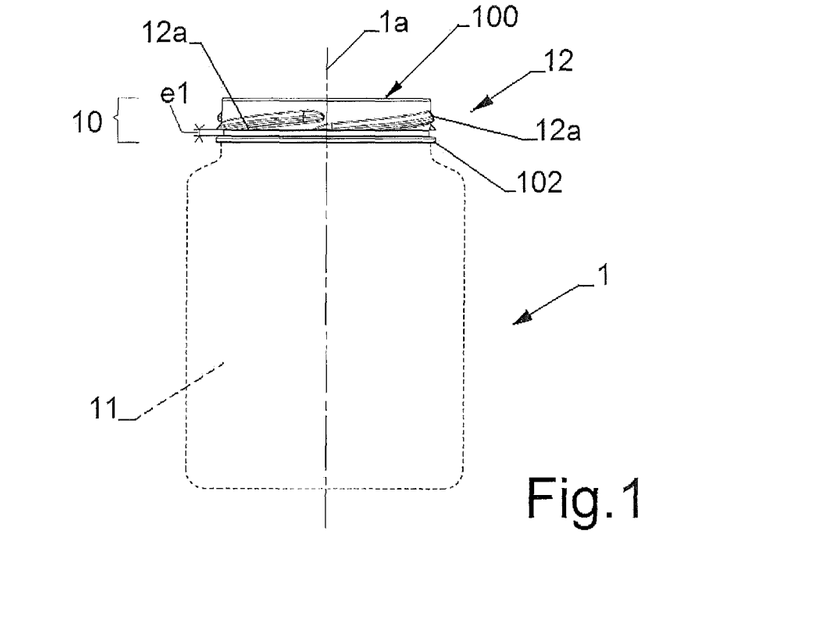
FIG. 1 shows an example of wide-mouth plastic container of the invention.

Referring now to the drawings, FIG. 1 illustrates a wide-mouth plastic container 1 having a longitudinal central axis 1a, and comprising a hollow body 11 (in dotted lines) terminated by a reinforced short neck finish 10.

Within the scope of the invention, the hollow body 11 can have any shape and size.

Within the scope of the invention, the wide-mouth plastic container 1 can be made of any thermoplastic material. Among these thermoplastic materials, polyester resins are however the best candidates.

More especially, polyester resins that are suitable for carrying out the invention are those generally obtained through polycondensation of diols and dicarboxylic acids or esters thereof.

Among the diols suitable for carrying out the invention, one can mention: ethylene glycol, diethylene glycol, propylene glycol, 1,3-propanediol, 1,4-butanediol, 1,3-butanediol, 2,2-dimethylpropanediol, neopentyl glycol, 1,5-pentanediol, 1,2-hexanediol, 1,8-octanediol, 1,10-decanediol, 1,4-cyclohexanedimethanol, 1,5-cyclohexanedimethanol, 1,2-cyclohexanedimethanol, or mixtures thereof.

Among the dicarboxylic acids suitable for carrying out the invention, one can mention: terephthalic acid, isophthalic acid, orthophthalic acid, 2,5-naphthalene dicarboxylic acid, 2,6-naphthalene dicarboxylic acid, 1,3-naphthalene dicarboxylic acid, 2,7-naphthalene dicarboxylic acid, methyl terephthalic acid, 4,4'-diphenyldicarboxylic acid, 2,2'-diphenyldicarboxylic acid, 4,4'-diphenylether dicarboxylic acid, 4,4'-diphenylmethanedicarboxylic acid, 4,4'-diphenylsulfonedicarboxylic acid, 4,4'-diphenylisopropylidene-dicarboxylic acid, sulfo-5-isophthalic acid, oxalic acid, succinic acid, adipic acid, sebacic acid, azelaic acid, dodecanedicarboxylic acid, dimer acid, maleic acid, fumaric acid, and all aliphatic diacids, cyclohexane dicarboxylic acid. The dicarboxylic acids can be introduced in the polycondensation medium in an esterified form, for example via methoxy or via ethoxy.

The preferred polyesters for carrying out the invention are polyethylene terephthalate (PET), homo or copolymers thereof, and mixtures thereof.

Although the containers shown in the appended drawings are monolayer containers, the invention is however not limited to monolayer containers but encompass also multilayer containers or containers manufactured from a mixture of materials.

Figure 10:
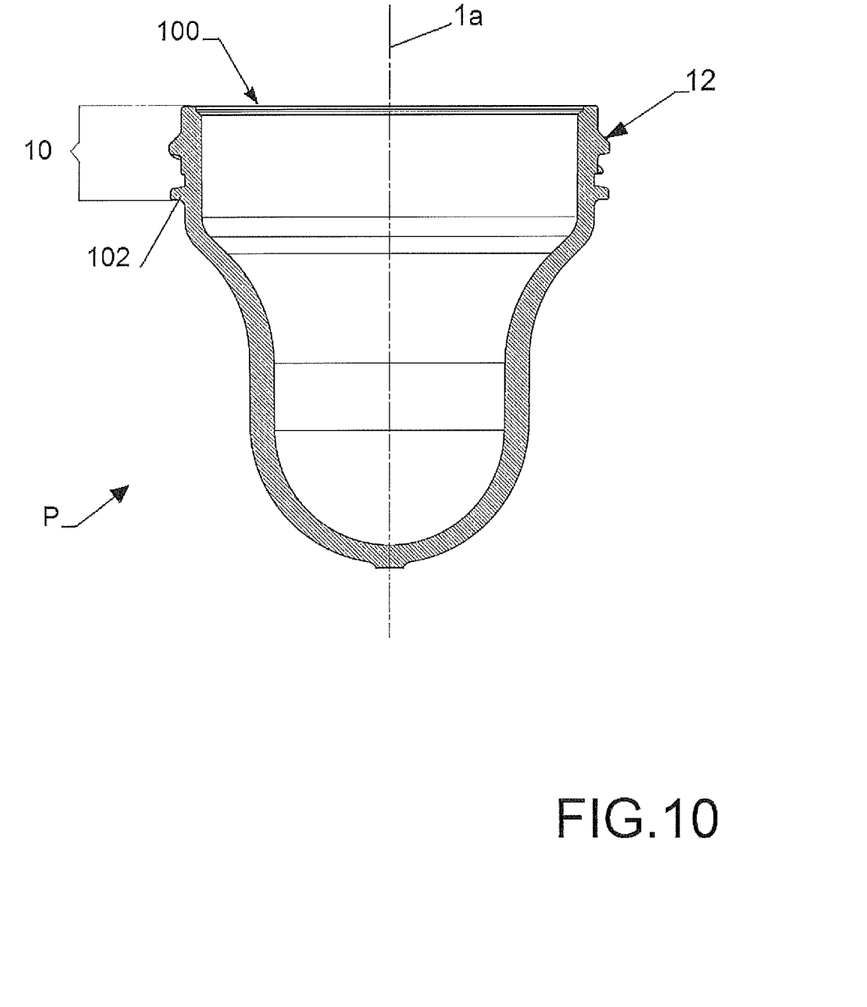
FIG. 10 shows a wide-mouth plastic preform that can be used for making a wide-mouth container of the invention.

The wide-mouth plastic container 1 of FIG. 1 is an injection stretched blow-molded container obtained for example from the plastic wide-mouth preform P shown on FIG. 10. This preform P can be manufactured by the well-known technique of injection molding. Within the scope of the invention, this preform P can be a monolayer preform or a multilayer preform or preforms manufactured from a mixture of materials When this preform P is stretch blow-molded in a mold, the neck finish 10 is used for maintaining the preform in the blowing mold, and is thus not stretched. The body portion below the neck finish 10 is biaxially stretched in an axial direction and in a radial direction in order to form a container body 11 of higher volume.

Within the scope of the invention a "one stage process" or a "two stages process" can be used.

The final shape and size of the container will depend of the blow mold that is being used and of the stretch ratios that are practiced.

Preferably, but not necessarily, at least the neck finish 10 of the container 1 or preform P has been crystallized by heating and forms an opaque crystallized neck finish having preferably a crystallinity of at least 25%. This crystallization can also extend slightly below the neck finish 10. For example when non-colored polyester is used, and in particular non-colored PET, the opaque crystallized neck finish 10 is white.

Within the scope of the invention, the wide-mouth container can be intended to be filled with a hot product at a temperature above room temperature (i.e. above 25° C.), such as for example tomato sauce or the like, jelly, jam or preserves. The invention is however not limited to hot-fill wide-mouth containers.

Figure 3:
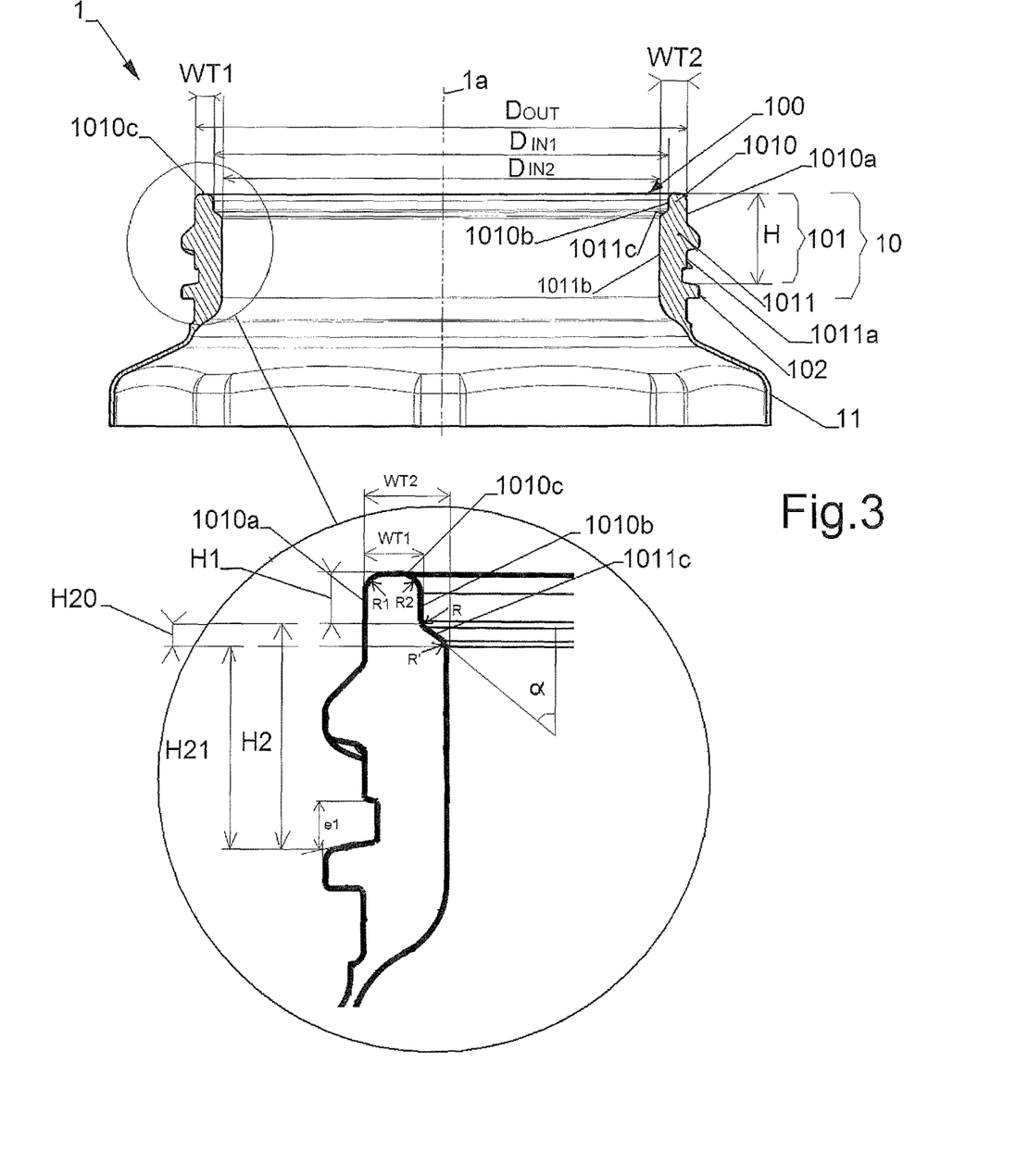
FIG. 3 is a view in cross-section of a first variant of a neck finish.

A first example of reinforced neck finish 10 is shown on FIG. 3. This neck finish 10 comprises an outer neck support ring 102, a neck portion 101 extending upwards from the support ring 102 and terminated by a wide-mouth opening 100 having a large inner diameter $D_{IN1}$.

The neck portion 101 comprises an upper cylindrical portion 1010 and a reinforced lower portion 1011, which is thicker at least in the top part of the reinforced lower portion than the upper portion 1010. Said cylindrical upper portion 1010 is extending between said wide-mouth opening 100 and said reinforced lower portion 1011, and said reinforced lower portion 1011 is extending from said upper portion 1010 down to the neck support ring 102.

The upper cylindrical portion 1010 is delimited by an outer cylindrical face 1010a and by an inner cylindrical face 1010b, both centered around longitudinal axis 1a. Said upper cylindrical portion 1010 has a substantially constant wall thickness $WT_1$.

The radius R1 between the top sealing surface 1010c of the upper portion 1010 and outer cylindrical face 1010a, and the radius R2 between the top sealing surface 1010c of the upper portion 1010 and inner cylindrical face 1010b are not more than 0.75 mm, preferably are not more than 0.4 mm, and preferably are not less than 0.2 mm.

The reinforced lower portion 1011 comprises an outer cylindrical face 1011a and an inner cylindrical face 1011b, both centered around longitudinal axis 1a.

More particularly, the neck support ring 102 protrudes outwardly beyond said outer face 1011a of the reinforced lower portion 1011.

The inner face 1011b of the reinforced lower portion 1011 is transitioning to the inner face 1010b of the upper portion 1010 along a transition step 1011c. The junction between the top end of this transition step 1011c and the inner face 1010b of the upper portion 1010 is concave and defines an inward transition radius R. The junction between the bottom end of this transition step 1011c and the inner face 1011b of the reinforced lower portion 1011 is convex and defines an outward transition radius R'. In this particular embodiment, the transition step 1011c is formed by a flat slanted wall in the inner face 1011b.

The thickness $WT_2$ of said reinforced lower portion 1011, measured between the two outer and inner cylindrical faces 1011a and 1011b, is greater than the thickness $WT_1$ of said upper portion 1010. Said thickness $WT_2$ is equal to the thickness of said reinforced lower portion 1011 measured at the bottom end of the transition step 1011c, and said thickness $WT_1$ is equal to the thickness of said reinforced lower portion 1011 measured at the top end of the transition step 1011c.

On the appended figures, the height of the neck portion 101 (above the neck support ring 102) is referred H. The height of the upper neck portion 1010 is referred $H_1$. The height of the reinforced lower neck portion 1011 is referred $H_2$; the height of the reinforced lower portion 1011 in the region of the transition step 1011c is referred $H_{20}$; the height of the reinforced lower portion 1011 below the transition step 1011c is referred $H_{21}$. The inner diameter of the neck portion 1011 is referred $D_{IN2}$. The angle defined by the transition step 1011c with the longitudinal axis 1a is referred α.

Figure 2:
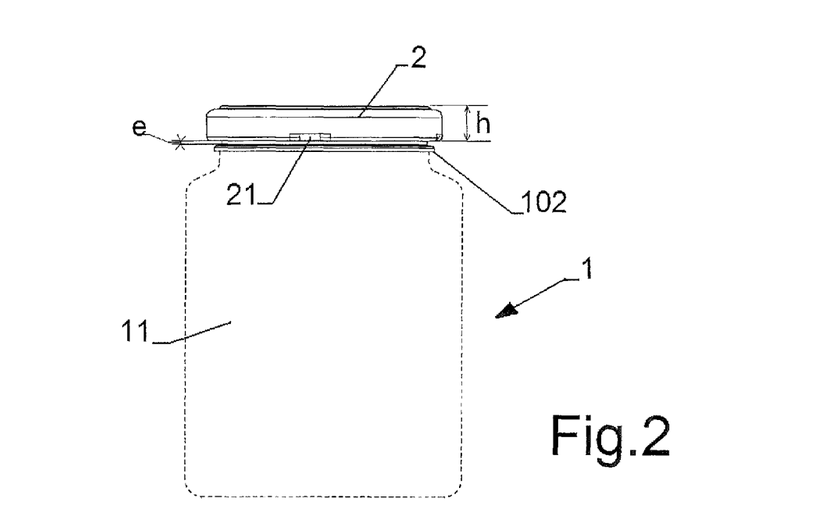
FIG. 2 shows the container of FIG. 1 closed by a removable lid.
Figure 4:
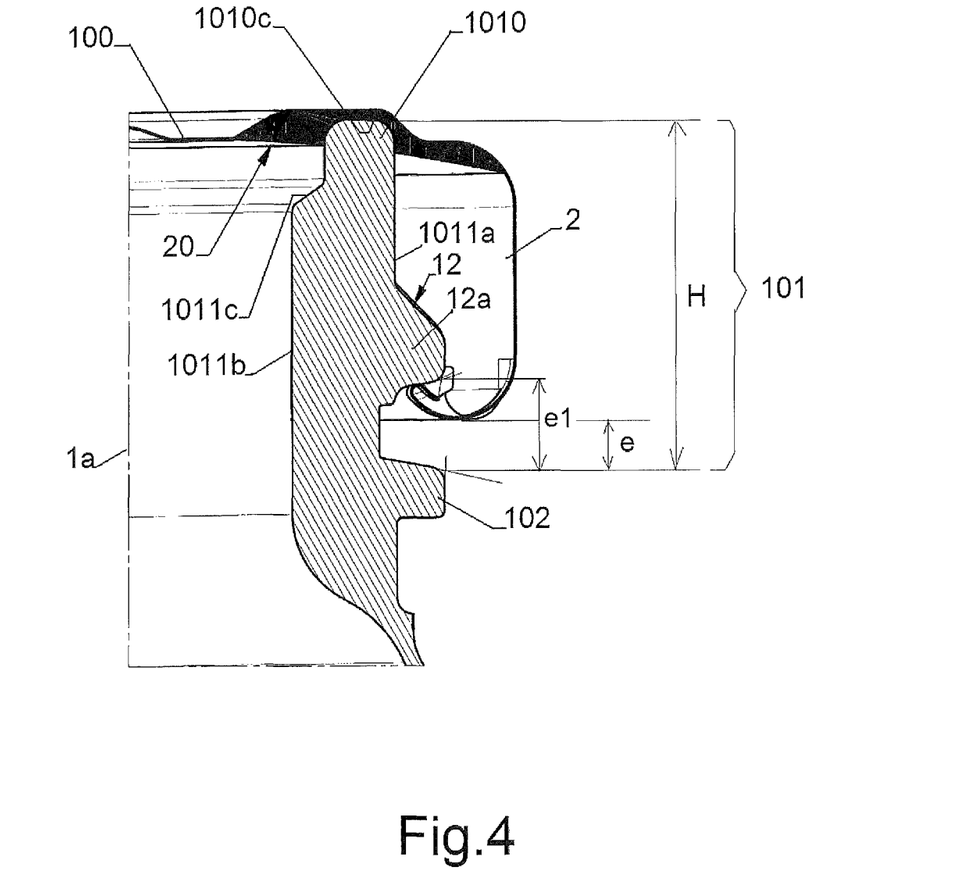
FIG. 4 is a view in transverse cross-section of the neck finish of FIG. 3 closed by a removable lid.

FIG. 2 shows the container 1 of FIG. 1 capped with a removable closure 2 of small height h, which can be for example a metal lid. FIG. 4 shows the neck finish 10 of FIG. 3 closed by the lid 2. In reference to this FIG. 4, when the lid 2 is fitted onto the neck finish 10, the wide-mouth opening 100 is hermetically closed by the lid 2 and the neck support ring 102 is not surrounded by the lid 2, but is below the lid 2, in such a way that the neck support ring 102 is accessible when the container 1 or the preform P is closed, and can be used for example for handling the closed container or the closed preform.

More especially, the lid comprises an internal gasket 20 or the like, made of deformable material such as rubber or the like, that is in contact with the upper neck portion 1010 in such a way to make a tight seal between the lid 2 an said upper neck portion 1010 on the whole periphery of the wide-mouth opening 100. The upper neck portion 1010 is dimensioned in such a way to obtain such a peripheral sealing zone between the neck finish 10 and a standard lid 2 available on the market.

According to the invention, the reinforced lower neck portion 1011 enables to obtain a neck finish portion 101, above the neck support ring 102, that can be closed by standard lid 2, that can have a small height H, and that is advantageously less deformable than a comparative neck finish of same height H but having, preferably, a constant smaller wall thickness $WT_1$ over its whole height H.

In reference to FIGS. 1 and 4, the neck finish 10 is provided also with a discontinuous thread 12 comprising separated inclined thread portions 12a, and adapted for safely screwing the lid 2 onto the neck finish 10. In reference to FIGS. 1 and 4, the gap between the lower extremity of each thread portion 12a and the upper face of the neck support ring is referred $e_1$. Preferably, said gap $e_1$ is not more than 2.0 mm.

Figure 7:
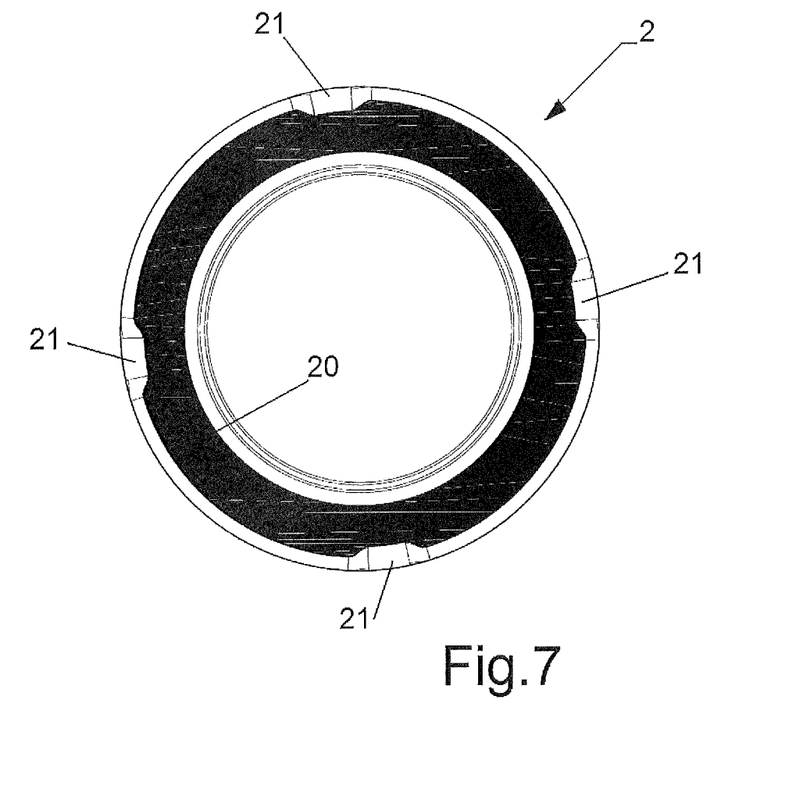
FIG. 7 is a bottom view of the lid of FIGS. 2 and 3.

More especially, in reference to FIG. 7, the lid 2 comprises several lugs 21 (four lugs in this particular example) that are adapted to cooperated with the thread portions 12a on the neck finish 10.

Figure 8:
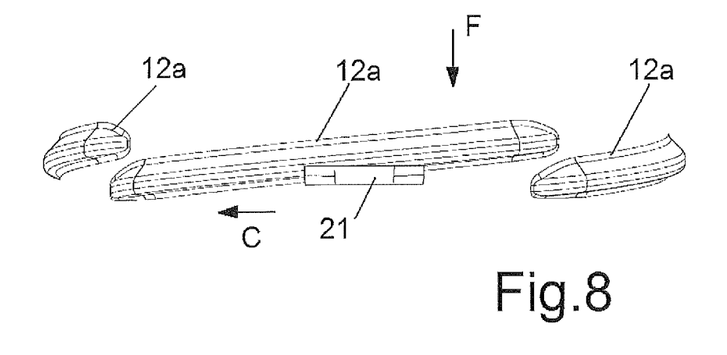
FIG. 8 shows a discontinuous thread of a neck finish and a lug of a lid during a closing twist of the lid.
Figure 9:
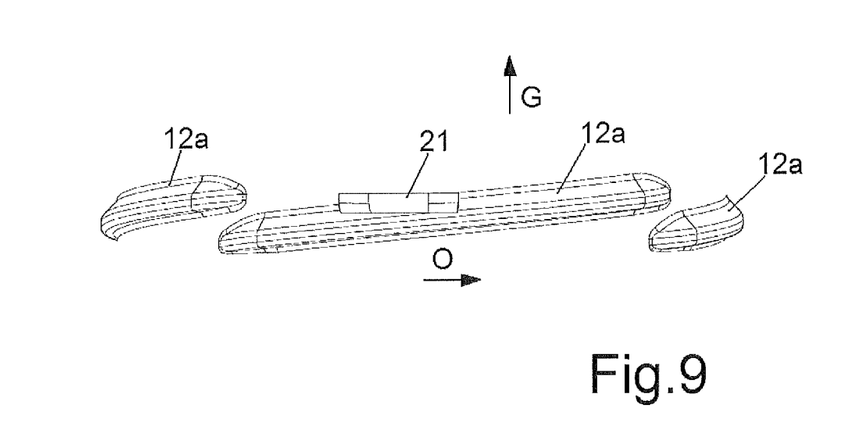
FIG. 9 shows a discontinuous thread of a neck finish and a lug of a lid during an opening twist of the lid.

More especially, in references to FIGS. 8 and 9, once the lid 2 is screwed onto the neck finish 10 of the container 1, the lid 2 can be twisted in one direction (FIG. 8/arrow C) into a closed position and can be twisted in the reverse direction (FIG. 9/arrow O) into an opened position.

During the twisting of the lid 2 from the opened position into the closed position, each of said lugs 21 (FIG. 8) comes into contact and is guided by the lower edge of a thread portion 12a in such a way that the lid 2 is forced by the lugs 21 and thread portions 12a to move axially and downwardly (FIG. 8/arrow F), i.e. closer to the wide-mouth opening 100. In reference to FIG. 4, when the lid 2 is in the closed position, the internal sealing material 20 of the lid 2 is in contact with and is locally deformed by the upper portion 1010 of the neck portion 101 that penetrates in the sealing material 20. A tight seal is thus achieved only between the top sealing surface 1010c of this upper portion 1010 of the neck portion 101 and the lid 2. In contrast, there is no contact and no seal between the lid 2 and the inner face 1011b of the lower reinforced portion 1011 of the neck portion 101.

During the twisting of the lid 2 from the closed position into the opened position, each of said lugs 21 (FIG. 9) comes into contact and is guided by the upper edge of a thread portion 12a in such a way that the lid 2 is forced by the lugs 21 and thread portions 12a to move axially away from the wide-mouth opening 100 (FIG. 9/arrow G).

The invention is however not limited to the use a closure constituted by a lid 2 comprising such lugs 21, but encompasses any removable closure or cap that can be screwed onto a neck finish, and particular any closure or cap comprising for example a thread adapted to cooperated with a thread on the neck finish. Within the scope of the invention, the thread of the neck finish can be a discontinuous thread or continuous thread.

In reference to FIGS. 2 and 4, when the height H of the neck portion 10 above the neck support ring 102 is sufficiently small, the gap e between the lower edge of the lid 2 and the neck support ring 102 is also small, which improves the aesthetic of the closed neck finish, especially when the neck finish 10 is an opaque crystallized neck finish, and/or when the wide-mouth plastic container is closed by a lid 2 of small height h such as a metal lid. Such a small gap e gives to the consumer the feeling that the container is correctly closed.

Figure 5:
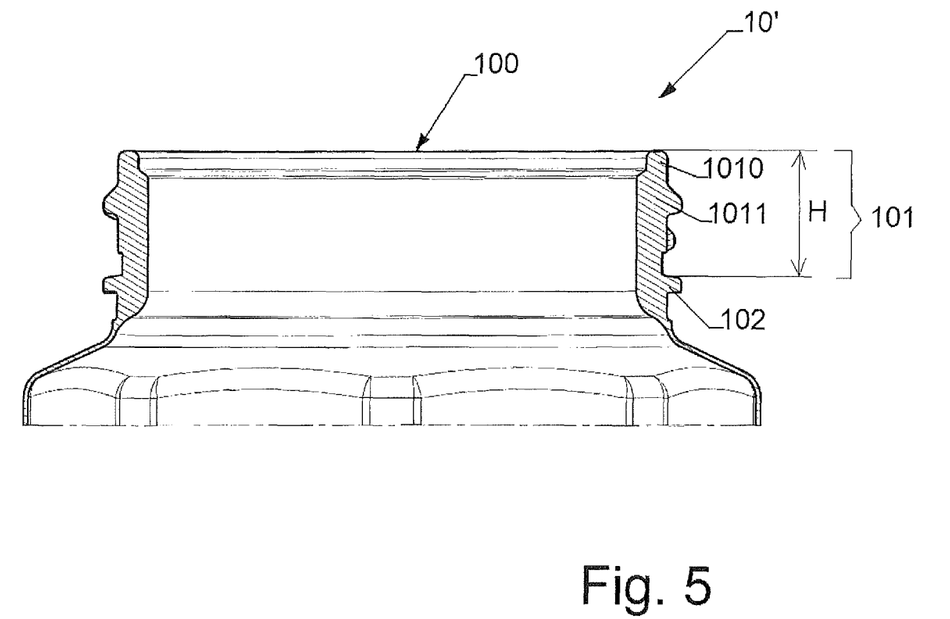
FIG. 5 is a view in cross-section of a second variant of a neck finish.
Figure 6:
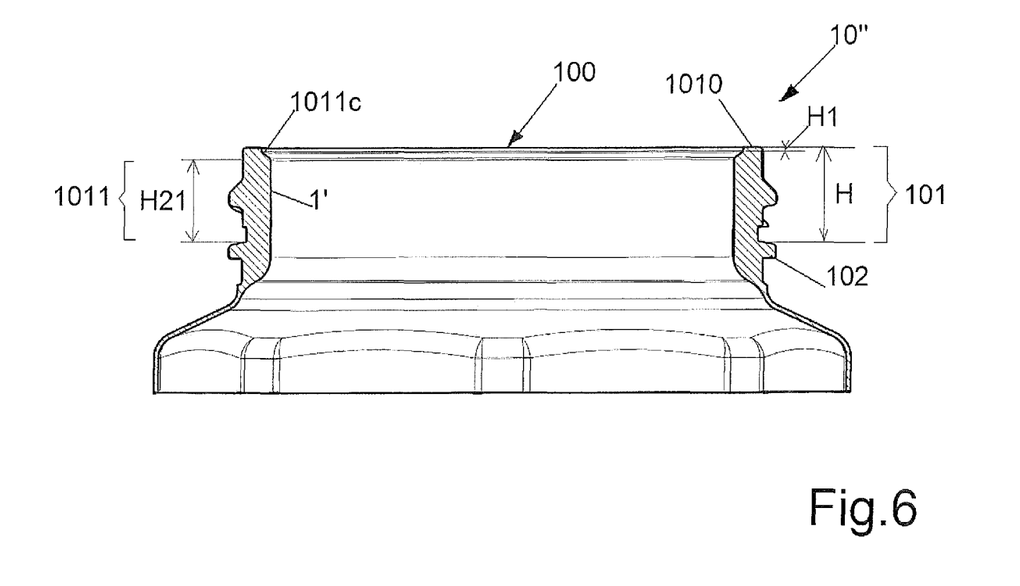
FIG. 6 is a view in cross-section of a third variant of a neck finish.

Other example of neck finishes 10' and 10" are shown on FIGS. 5 and 6 respectively.

In the variant of FIG. 5, the height H of the neck finish 10' is higher than the height H of the neck finish of FIG. 3. This neck finish 10' of FIG. 5 is advantageously more resistant to deformation than the neck finish 10, but when the neck finish 10' is closed by lid 2, the gap e between the lower edge of the a lid 2 and the neck support ring102 is however bigger.

In the variant of FIG. 6, the height $H_{21}$ of the reinforced lower portion 1011 of the neck finish 10" is bigger than the height $H_{21}$ of the reinforced lower portion 1011 the neck finish 10 of FIG. 3, and the height $H_1$ of the upper neck portion 1010 is very small, which enables advantageously to obtain a neck finish 10" that can have the same small height H than the neck finish 10 of FIG. 3, but that is advantageously more resistant to deformation than said neck finish 10.

The table below gives some examples of main dimensions for neck finishes 10, 10' and 10" made of PET.

TABLE

Example of dimensions

| Dimensions | Neck finish 10' | Neck finish 10 | Neck finish 10" |
|---|---|---|---|
| $D_{OUT}$ | 58.9 mm | 58.9 mm | 58.9 mm |
| $D_{IN1}$ | 54.49 mm | 54.49 mm | 54.49 mm |
| $D_{IN2}$ | 52.48 mm | 52.48 mm | 52.97 |
| H (=$H_1$ + $H_2$) | 13.5 mm | 11.4 mm | 11.4 mm |
| H1 | 2 mm | 2 mm | 0.6 mm |
| $H_2$(=$H_{20}$ + $H_{21}$) | 11.5 mm | 9.4 mm | 10.8 mm |
| $H_{20}$ | 0.71 mm | 0.54 mm | 0.54 mm |
| $H_{21}$ | 10.79 mm | 8.86 mm | 10.26 mm |
| α | 55° | 55° | 55° |
| $WT_1$ [($D_{OUT}$ − $D_{IN1}$)/2] | 2.205 mm | 2.205 mm | 2.205 mm |
| $WT_2$[($D_{OUT}$ − $D_{IN2}$)/2] | 3.21 mm | 3.21 mm | 2.965 mm |
| R1 | 0.75 mm | 0.4 mm | 0.4 mm |
| R2 | 0.75 mm | 0.4 mm | 0.4 mm |
| R | 0.2 mm | 0.2 mm | 0.2 mm |
| R' | 0.2 mm | 0.2 mm | 0.2 mm |

These dimensions are however not a limitation of the scope of the invention, and one skilled in the art can easily practice other dimensions within the scope of the invention.

In particular, but not necessarily, the assembly of the invention can be advantageously characterized by the following additional and optional characteristics, said additional and optional characteristics being taken alone or in combination:

The transition step of the plastic preform or container is formed by a flat slanted wall.

The height H of the neck portion 101 is not more than 15 mm.

The height H of the neck portion 101 is less than 13 mm.

The internal diameter $D_{IN1}$ of the wide-mouth opening 100 is not less than 40 mm.

The internal diameter $D_{IN1}$ of the wide-mouth opening 100 is not less than 50 mm.

The thickness $WT_2$ of the lower reinforced portion 1011 measured at the bottom end of the transition step 1011c is not less than 2.7 mm.

The thickness $WT_2$ of the lower reinforced portion 1011 measured at the bottom end of the transition step 1011c is not more than 4 mm.

The thickness $WT_1$ of the upper portion 1010 measured at the top end of the transition step 1011c is not less than 1.9 mm.

The thickness $WT_1$ of the upper portion 1010 measured at the top end of the transition step 1011c is not more than 2.7 mm.

The difference between the thickness $WT_2$ of the lower reinforced portion 1011 and the thickness $WT_1$ of the upper portion 1010 is not less than 30% of the thickness $WT_1$ of the upper portion 1010.

The height $H_1$ of the upper portion (1010) is not more than 3 mm.

The height $H_1$ of the upper portion 1010 is not less than 0.4 mm.

The height $H_2$ of the reinforced lower portion is not less than 9 mm.

The height $H_2$ of the reinforced lower portion is not more than 12 mm.

The height $H_{20}$ of the transition step 1011c is between 0.4 mm and 0.8 mm.

The height $H_2$ of the reinforced lower portion 1011 is not less than 75% of the height H of the neck portion 101.

The height $H_2$ of the reinforced lower portion 1011 is not less than 90% of the height H of the neck portion 101.

The angle α between the transition step 1011c and the longitudinal axis 1a of the preform or container is between 10° and 90°, and is preferably around 55°.

The ratio $D_{IN1}$/H of the internal diameter $D_{IN1}$ of the wide-mouth opening 100 and the height H of the neck portion 101 is not less than 3, and preferably not less than 4.

The preform P or container 1 is made of a plastic material comprising a homo or copolyester.

The preform P or container 1 is made of a plastic material comprising a PET homo or copolymer.

The thread is discontinuous and comprises inclined thread portions 12a.

The gap $e_1$ between the neck support ring 102 and the lower extremity of each of said inclined thread portions 12a is not more than 2.0 mm.

The upper portion comprises a top sealing surface, an outer cylindrical face, and an inner cylindrical face; the top sealing surface is transitioning to the outer cylindrical face along a first radius R1, and the top sealing surface is transitioning to the inner cylindrical face along a second radius R2; the first radius R1 and the second radius R2 are not more than 0.75 mm and not less than 0.2 mm, and preferably are not more than 0.4 mm.

The neck finish is an opaque crystallized neck finish.

The container is an injection stretched blow-molded container.

The closure comprises an internal gasket 20 comprising said deformable sealing material.

The closure comprises a metal lid 2.

The closure can be twisted in one direction (C) into a closed position and can be twisted in the reverse direction (O) into an opened position; during the twisting of the closure from the opened position into the closed position, the closure (2) is forced by to move axially closer to the wide-mouth opening 100; during the twisting of the closure from the closed position into the opened position the closure is forced to move axially away from the wide-mouth opening 100.

The removable closure 2 comprises lugs 21)adapted to cooperate with the thread 12 of the plastic preform or container in such a way that once the closure 2 is fitted onto the neck finish of the plastic the preform or container, the closure can be twisted in one direction (C) into a closed position and can be twisted in the reverse direction (O) into an opened position; during the twisting of the closure from the opened position into the closed position each of said the lugs 21 comes into contact and is guided by the lower edge of a thread portion 12a in such a way that the closure is forced by the lugs 21 and thread portions 12a to move axially closer to the wide-mouth opening 100; during the twisting of the closure from the closed position into the opened position each of said the lugs 21 comes into contact and is guided by the upper edge of a thread portion 12a in such a way that the closure is forced by the lugs 21 and thread portions 12a to move axially away from the wide-mouth opening 100.

The invention claimed is:

1. An assembly comprising plastic preform or container and a removable closure that can be screwed onto the plastic preform or container, wherein the plastic preform or container comprises a hollow body and a neck finish terminated by a wide-mouth opening, the neck finish comprising a neck support ring and a neck portion extending between the wide-mouth opening and the neck support ring, wherein the neck portion has a height and is provided with a thread for screwing the removable closure onto the neck portion, and comprises an upper portion and a reinforced lower portion, wherein the upper portion is extending between the wide-mouth opening and the reinforced lower portion, wherein the reinforced lower portion is extending between the upper portion and the neck support ring, wherein an inner face of the reinforced lower portion is transitioning to an inner face of the upper portion along a transition step in such a way that the reinforced lower portion is thicker than the upper portion at least in a top part of the reinforced lower portion, wherein the assembly includes (i) a junction between a top end of the transition step and the inner face of the upper portion that is concave and defines an inward transition radius, and (ii) a junction between a bottom end of the transition step and the inner face of the reinforced lower portion that is convex and defines an outward transition radius, and wherein the removable closure comprises a deformable sealing material, and when the removable closure is screwed onto the neck finish of the preform or container, the neck support ring is disposed below the removable closure and the upper portion of the neck portion is in contact with the deformable sealing material, and a seal is achieved only between the upper portion of the neck portion and the removable closure.

2. The assembly of claim 1 wherein the transition step of the plastic preform or container is formed by a flat slanted wall.

3. The assembly claim 1, wherein the height of the neck portion is not more than 15 mm.

4. The assembly of claim 1, wherein the height of the neck portion is less than 13 mm.

5. The assembly of claim 1, wherein an internal diameter of the wide-mouth opening is not less than 40 mm.

6. The assembly of claim 1, wherein an internal diameter of the wide-mouth opening is not less than 50 mm.

7. The assembly of claim 1, wherein a thickness of the lower reinforced portion measured at a bottom end of the transition step is not less than 2.7 mm.

8. The assembly claim 1, wherein a thickness of the lower reinforced portion measured at the bottom end of the transition step is not more than 4 mm.

9. The assembly of claim 1, wherein the thickness of the upper portion measured at a top end of the transition step is not less than 1.9 mm.

10. The assembly of claim 1, wherein the thickness of an upper portion measured at the top end of the transition step is not more than 2.7 mm.

11. The assembly of claim 1, wherein a difference between the thickness of the lower reinforced portion and the thickness of the upper portion is not less than 30% of the thickness of the upper portion.

12. The assembly of claim 1, wherein the height of the upper portion is not more than 3 mm.

13. The assembly of claim 1, wherein the height of the upper portion is not less than 0.4 mm.

14. The assembly of claim 1, wherein the height of the reinforced lower portion is not less than 9 mm.

15. The assembly of claim 1, wherein the height of the reinforced lower portion is not more than 12 mm.

16. The assembly of claim 1, wherein the height of the transition step is between 0.4 mm and 0.8 mm.

17. The assembly of claim 1, wherein the height of the reinforced lower portion is not less than 75% of the height of the neck portion.

18. The assembly claim 1, wherein the height of the reinforced lower portion is not less than 90% of the height of the neck portion.

19. The assembly of claim 1, wherein an angle between the transition step and a longitudinal axis of the preform or container is between 10° and 90°.

20. The assembly of claim 1, wherein a ratio of an internal diameter of the wide-mouth opening and the height of the neck portion is not less than 3.

21. The assembly of claim 1, wherein the preform or container is made of a plastic material comprising a homo or copolyester.

22. The assembly of claim 1, wherein the preform or container is made of a plastic material comprising a PET homo or copolymer.

23. The assembly of claim 1, wherein the thread is discontinuous and comprises inclined thread portions.

24. The assembly of claim 23 wherein a gap between the neck support ring and a lower extremity of each of the inclined thread portions is not more than 2.0 mm.

25. The assembly of claim 1, wherein the upper portion comprises a top sealing surface, an outer cylindrical face, and an inner cylindrical face, and wherein the top sealing surface transitions to the outer cylindrical face along a first radius, and the top sealing surface transitions to the inner cylindrical face along a second radius, and wherein the first radius and the second radius are not more than 0.75 mm and not less than 0.2 mm.

26. The assembly of claim 1, wherein the neck finish is an opaque crystallized neck finish.

27. The assembly of claim 1, wherein the container is an injection stretched blow-molded container.

28. The assembly of claim 1, wherein the closure comprises an internal gasket comprising the deformable sealing material.

29. The assembly of claim 1, wherein the closure comprises a metal lid.

30. The assembly of claim 1, wherein the closure can be twisted in one direction into a closed position and can be twisted in a reverse direction into an opened position, and wherein during the twisting of the closure from the opened position into the closed position the closure is forced by to move axially closer to the wide-mouth opening, and wherein during the twisting of the closure from the closed position into the opened position the closure is forced to move axially away from the wide-mouth opening.

31. The assembly of claim 1, wherein the removable closure comprises lugs adapted to cooperate with the thread of the plastic preform or container in such a way that once the closure is fitted onto the neck finish of the plastic preform or container, the closure can be twisted in one direction into a closed position and can be twisted in a reverse direction into an opened position, and wherein during the twisting of the closure from the opened position into the closed position each of the lugs comes into contact and is guided by a lower edge of a thread portion in such a way that the closure is forced by the lugs and thread portions to move axially closer to the wide-mouth opening, and wherein during the twisting of the closure from the closed position into the opened position each of the lugs comes into contact and is guided by an upper edge of a thread portion in such a way that the closure is forced by the lugs and thread portions to move axially away from the wide-mouth opening.

32. The assembly of claim 1, wherein the neck support ring protrudes outwardly beyond an outer face of the reinforced lower portion.

33. The assembly of claim 1, wherein an angle between the transition step and a longitudinal axis of the preform or container is 55°.

* * * * *